(12) United States Patent
Nakata et al.

(10) Patent No.: US 6,718,133 B2
(45) Date of Patent: Apr. 6, 2004

(54) MEASURING DISTANCE DEVICE

(75) Inventors: Koichi Nakata, Kokubunji (JP); Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/055,332

(22) Filed: Jan. 23, 2002

(65) Prior Publication Data
US 2002/0097995 A1 Jul. 25, 2002

(30) Foreign Application Priority Data

Jan. 24, 2001 (JP) ........................................ 2001-015968

(51) Int. Cl.[7] .............................................. G03B 13/36
(52) U.S. Cl. ........................ 396/96; 396/104; 396/106; 396/109; 396/124
(58) Field of Search ................................ 396/104, 106, 396/109, 121–123, 96, 124

(56) References Cited

U.S. PATENT DOCUMENTS 5,223,885 A * 6/1993 Nakajima .................... 396/104
6,501,910 B2 * 12/2002 Kindaichi .................... 396/96

FOREIGN PATENT DOCUMENTS

JP           8-334678           12/1996

* cited by examiner

*Primary Examiner*—W. B. Perkey
(74) *Attorney, Agent, or Firm*—Straub & Pokotylo; John C. Pokotylo (57) ABSTRACT

This invention constitutes a measuring distance device including a sensor array which detects image signals of an object in a finder screen, a projection unit which projects a signal light on the object, a selection unit which selects a detection area for the image signal of the sensor array, a change unit (control unit) which makes detection areas selected by the selection unit different from each other when the signal light is projected or is not projected by the projection unit, and a focus adjustment unit which performs focus adjustment by an image signal output in the detection area of the sensor array selected by the selection unit. A reduction in time lag is achieved without increasing a read area, and an influence of harmful light is reduced. This device which can perform an accurate and high-speed process can be applied to a hybrid AF camera.

25 Claims, 7 Drawing Sheets

PREDETERMINED AREA

MEASURING DISTANCE DEVICE

CROSS-REFERENCE TO RELATED APPLICATIONS

This application is based upon and claims the benefit of priority from the prior Japanese Patent Application No. 2001-015968, filed Jan. 24, 2001, the entire contents of which are incorporated herein by reference.

BACKGROUND OF THE INVENTION

1. Field of the Invention

The present invention relates to the improvement of a measuring distance device used in a camera or the like and, in particular, to the improvement of a measuring distance device of a hybrid type or a combination type.

2. Description of Related Art

Auto-Focus (AF) techniques which are employed by AF cameras are roughly classified into AF techniques of a passive type using an image to be photographed and AF techniques of an active type using a measuring distance light projected from a camera. However, since these AF techniques have drawbacks based on their respective principles, in order to overcome these drawbacks, AF techniques of a hybrid type (to be referred to as "hybrid AF" hereinafter) are proposed.

In recent years, an AF in which two measuring distance schemes of a passive type and an active type are switched depending on states has been proposed.

However, various devices are required to rationally selectively use the two measuring distance schemes at a high speed. For example, in Jpn. Pat. Appln. KOKAI Publication No. 8-334678, the following switching scheme is proposed. That is, a passive AF operation is performed, and when the passive AF operation is finished within a predetermined period of time, an AF operation is performed on the basis of the result of the passive AF operation. When the integration process of the passive AF operation is performed for a long period of time, the passive AF operation is switched to an active AF operation.

However, with respect to a camera having the hybrid AF function, only a switching operation of the measuring distance schemes is described, and a switching operation of image signals used in a measuring distance operation is not described.

Even in a camera having the hybrid AF function, a sensor array in which a large number of photoelectric sensors are generally arranged is used to detect image signals. However, when all sensor outputs are used, a long time is taken to perform A/D conversion related to reading of information from these sensors. For this reason, a time lag between a measuring distance state and a photographing state becomes disadvantageously long.

In use of the hybrid AF function, when a measuring distance range is set in the same effective area in an active mode and a passive mode, an effective measuring distance range used in the active mode is limited. However, an ineffective integration process and an ineffective reading operation are performed to cause a further elongation of the time lag and a deterioration in measuring distance accuracy.

Furthermore, a signal of an unnecessary sensor array area is unexpectedly referred to in a measuring distance operation, so that an erroneous measuring distance operation may occur.

The present invention has been made in consideration of the drawbacks and the problems introduced above, and has as its object to provide a measuring distance device which can perform an accurate high-speed process for a hybrid AF camera.

BRIEF SUMMARY OF THE INVENTION

In order to solve the above problems and achieve the above object, a measuring distance device for a hybrid camera according to the present invention is characterized in that in a switching operation between an active AF operation, a limitation on use of an area which is "area selection" of a sensor is performed to optimize a working sensor area. A time lag or the like is shortened without increasing a read area, and an influence on harmful light is minimized as much as possible.

For this purpose, the following means are employed. For example, according to a first aspect of the present invention, there is provided a measuring distance device including:

a sensor array which detects an image signal related to an object to be photographed in a finder screen;

a projection unit which projects a signal light on the object;

a selection unit which selects a detection area for the image signal of the sensor array;

a change unit (control unit) which makes a detection area selected by the selection unit when projection of the signal light is performed by the projection unit different from a detection area selected by the selection unit when projection of the signal light is not performed by the projection unit; and a focus adjustment unit which performs focus adjustment on the basis of an image signal output in the detection area of the sensor array selected by the selection unit.

According to a second aspect of the present invention, there is provided a measuring distance device including:

a sensor array which detects an image signal related to an object to be photographed in a finder screen;

a first projection unit which projects a first signal light for a measuring distance operation on the object;

a second projection unit which projects a second signal light for a measuring distance operation on the object;

a first measuring distance unit which performs a measuring distance operation on the basis of an image signal output from the sensor array without projection of the signal lights for a measuring distance operation by the first and second projection units;

a second measuring distance unit which performs a measuring distance operation on the basis of an image signal output from the sensor array with projection of the signal light for a measuring distance operation by the first projection unit;

a third measuring distance unit which performs a measuring distance operation on the basis of an image signal output from the sensor array with projection of the signal light for a measuring distance operation by the second projection unit;

a selection unit which selects any one of the first to third measuring distance units;

a change unit (control unit) which changes detection areas for the image signal by the sensor array depending on a selection result of the selection unit; and a focus adjustment unit which performs focus adjustment on the basis of an image signal output in the detection area of the sensor array selected by the selection unit.

According to a third aspect of the present invention, there is provided a measuring distance device including:

a sensor array which detects an image signal related to an object to be photographed in a finder screen;

an integration control unit which integrates the image signal detected by the sensor array;

a first projection unit which projects a first signal light for a measuring distance operation on the object;

a second projection unit which projects a second signal light for a measuring distance operation on the object;

a selection unit which selects a detection area for the image signal detected by the sensor array;

a first control unit which determines whether, depending on an integration voltage of the integration control unit when projection of light for a pre-measuring distance operation is performed by the first projection unit, an original measuring distance operation is performed by using the first projection unit or an original measuring distance operation is performed by using the second projection unit;

a second control unit which changes detection areas selected by the selection unit depending on a determination result of the first control unit; and a focus adjustment unit which performs focus adjustment on the basis of an image signal output in the detection area of the sensor array selected by the selection unit.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiment given below, serve to explain the principles of the invention.

FIGS. 6A and 6B show cases in which effective ranges in a measuring distance operation using an IRED are different from each other, wherein

DETAILED DESCRIPTION OF THE INVENTION

A measuring distance device according to the present invention is improved such that a measuring distance operation having accuracy higher than that of a conventional measuring distance device can be performed by appropriately switching employed measuring distance schemes and by switching an effective area and an area to be used in a sensor area. A measuring distance device to realize these characteristic features will be described as a measuring distance device built in a camera below with reference to the following embodiments.

Figure 1:
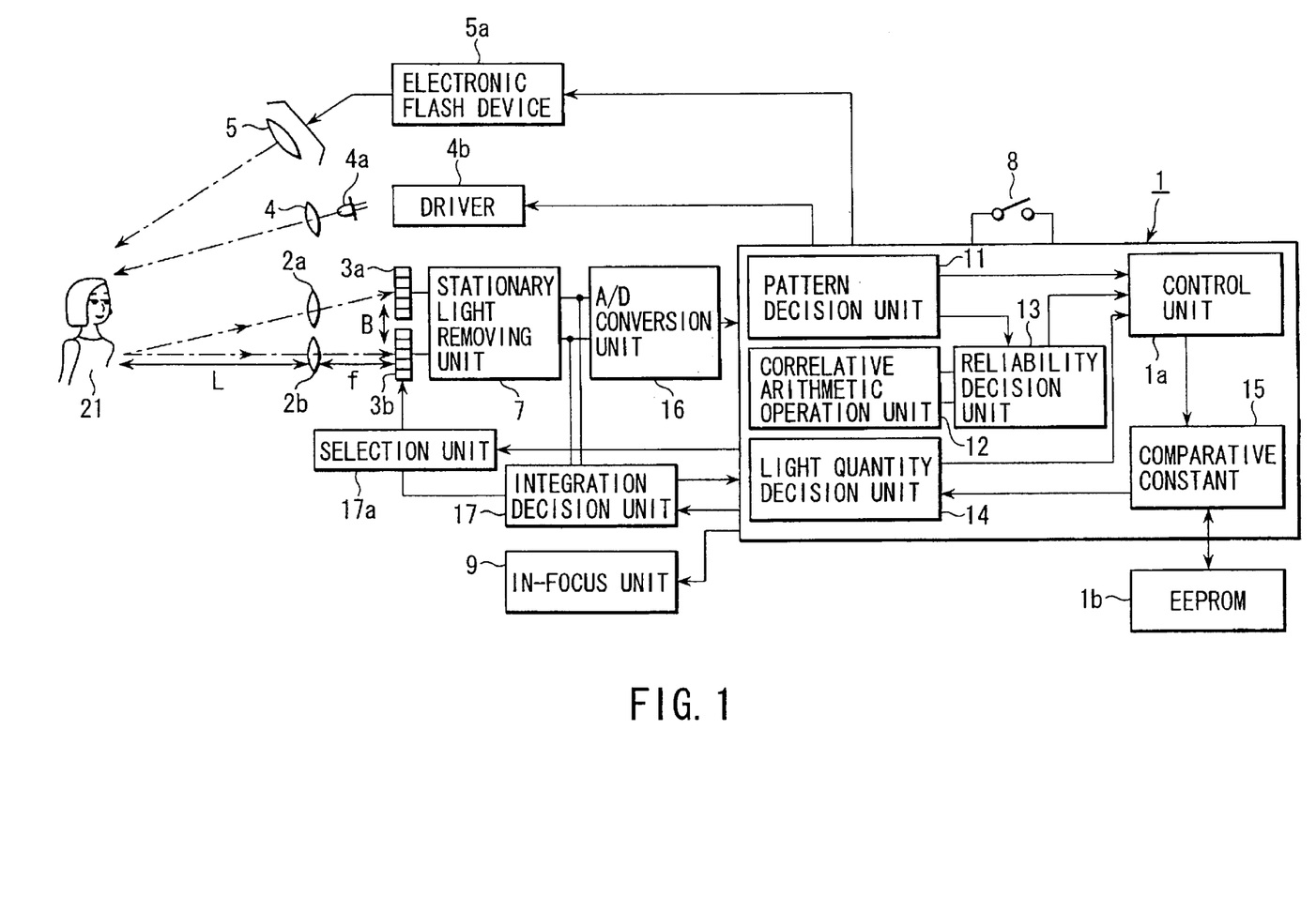
FIG. 1 is a schematic diagram showing the configuration of a measuring distance device according to the present invention.

First, the basic configuration of a camera including this measuring distance device and related to the present invention is shown in FIG. 1. Thereafter, the detailed parts of the camera will be described with reference to FIGS. 2A to 8.

As shown in FIG. 1, in this camera, sensor arrays 3a and 3b in which pixels for light-receiving elements are arranged are arranged in parallel to face an object 21 to be focused. In order to form the image of the object 21 here, one pair of light-receiving lenses 2a and 2b are arranged in front of the pair of sensor arrays 3a and 3b such that the light-receiving lenses 2a and 2b are separated from each other by a focal distance f to give a predetermined parallax B between the light-receiving lenses 2a and 2b, and an object distance L is calculated by a known "principle of triangular measuring distance".

The images of the object 21 formed on the two sensor arrays 3a and 3b change by decreasing or increasing the object distance L, thereby changing the relative positions of optical axis references of the light-receiving lenses 2a and 2b. In order to detect the changes of the positions, an analog-to-digital (A/D) converter 16 converts integration outputs (In this case, integration circuits related to the outputs are expressed to be included in the pixels of the light-receiving elements of the sensor arrays 3a and 3b.) from the sensor arrays 3a and 3b into digital signals. An arithmetic controller (CPU) 1 constituted by a one-chip microcomputer compares the digital image signals of the sensor arrays 3a and 3b with each other to detect the difference between the relative positions and to calculate a distance. At this time, since a long period of time is required to digitize outputs from all the sensors, the camera according to the present invention further has a selection unit 17a as selection means for selecting the areas of the sensor arrays 3a and 3b. The selection unit 17a is devised such that a switching operation of a selection switch 17b constituting the selection unit 17a can select a specific area to be used.

In order to check whether the images detected from the two sensor arrays 3a and 3b are images of the same object 21 or not, the CPU 1 has functional units such as a correlative arithmetic operation unit 12 which detects the difference between the relative positions of the images and a pattern decision unit 11 which checks whether the patterns of the images are suitable for a measuring distance operation or not.

The CPU 1 further has a reliability decision unit 13 which decides that the reliability of a measuring distance operation is low when the degree of coincidence between the images when the relative positional error is detected or when the result of the pattern decision of the images is a low-contrast pattern, a repeated pattern, a monotonous increase pattern or a monotonous decrease pattern.

The measuring distance device further has a light quantity decision unit 14 which projects light for a measuring distance operation when stationary light is removed and which decides a quantity of incident light reflected by the object 21. On the basis of the results of these functions, an amount of control of a in-focus unit 9 serving as a determining unit for determining an in-focus position. The CPU 1 detects an input state of a release switch 8, controls a photographing sequence (camera sequence) of the camera, and controls a light-projection means such as the electronic flash unit 5a or the IRED 4a even in a measuring distance operation through a driver 4b as needed such that the electronic flash unit 5a and the IRED 4a are properly selected.

Depending on an output from the light quantity decision unit 14 which decides the brightness of an object to be focused, a pulse width of pulse-like projection of light is determined. The light quantity decision unit 14 is set such that the brightness is decided on the basis of the output results of the sensor arrays 3a and 3b when light for a measuring distance operation is projected.

A fact which must be considered when the measuring distance device performs a measuring distance operation, i.e., a circuit configuration and a processing operation for the removing function of light components caused by stationary light sunlight or artificial light which illuminates an object will be described below with reference to FIGS. 2A and 2B.

In passive type AF which obtains an image signal from an output from a sensor array, a technique which integrates an optical current depending on incident light to convert the optical current into an appropriate voltage signal. On the other hand, in active type AF, a stationary light removing function which removes a signal generated by stationary incident light and which detects only an optical current caused by light obtained by reflecting projected light is important.

Figure 2A:
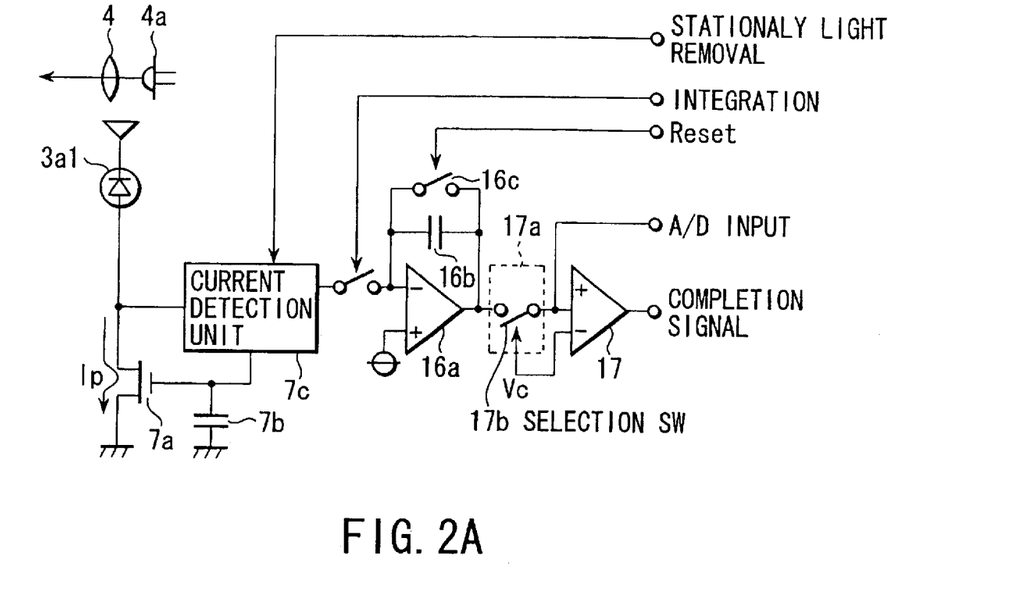
FIG. 2A is a diagram showing a partial configuration of the measuring distance device.

A circuit configuration having a stationary light removing function is illustrated in FIG. 2A. A light-receiving element $3a_1$ illustrated in FIG. 2A is, e.g., an element corresponding to one of pixels constituting the sensor array 3a for detecting an image signal. A circuit design is made such that an optical current $I_p$ output from the light-receiving element $3a_1$ depending on a quantity of light being incident on the element flows into GND through a transistor 7a of a stationary light removing unit 7. The circuit of a current detection unit 7c controls a gate voltage of the transistor 7a such that no current flows in an integration circuit constituted by an integration amplifier 16a, an integration capacitor 16b, and reset switch 16c.

A holding capacitor 7b is arranged to fix the potential of the gate voltage. In this fixing state, for example, when the infrared light-emitting diode (IRED) 4a is turned on to project pulse-like measuring distance light as a pulse on the object 21 through a projection lens 4, and when the circuit of the current detection unit 7c is inactivated, the following operation is performed. More specifically, the changes of the voltages at both the ends of the capacitor 7b cannot respond to a sharp change of the pulse-like projection of light. When the reset switch 16c is set in an ON state, only an optical current depending on the pulse light is input to the integration circuit, and a photoelectrically converted voltage based on the measuring distance pulse light is output to the output terminal of the integration amplifier 16a. Therefore, when this output is digitized, reflected light quantity data depending on a reflected signal light can be detected.

As the stationary optical current $I_p$ increases in a bright photographing scene, error components erroneously input to the integration circuit increases in number. The measuring distance device is easily affected by an offset error of the circuit. In addition, in the bright picture scene described above, it is difficult for the measuring distance device to accurately detect the reflected light quantity without changing the configuration of the measuring distance device. For this reason, with the measuring distance device, in order to remove the random nose component, when the brightness of the object 21 is at a level higher than a predetermined level, a measuring distance operation is repeated many times to average the measuring distance results.

The effect of the averaging can be obtained by increasing the number of times of integration, and measuring distance accuracy is improved. For this reason, when the object is bright, in particular, control is performed such that the number of times of emission and the number of times of integration are increased. In contrast to this, when the object is dark, since the random noise components are small in number, the number of times of integration need not be increased.

In general, in an image signal containing a noise component, an error is easily generated when the patterns of the left and right sensor arrays are compared with each other, and the probability of performing an erroneously measuring distance operation is high. Therefore, the number of times of integration is preferably decreased to suppress switching noise. In contrast to this, in order to reduce random noise such as thermal noise generated when a brightness is high, the number of times of integration is preferably increased to average the measuring distance results.

Figure 2B:
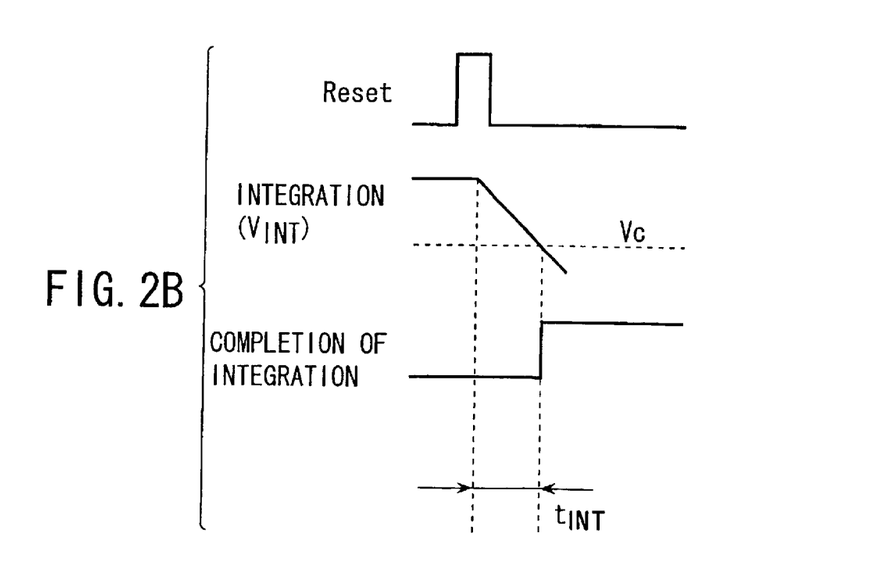
FIG. 2B is a graph showing a processing operation according to this part.

In order to decide the brightness of the stationary light, the current detection unit 7c is inactivated, and the reset switch 16c is temporarily turned on as shown in FIG. 2B. Thereafter, the stationary optical current $I_p$ flows into the integration amplifier 16a of the integration circuit, a time $t_{INT}$ until the integration voltage is at a predetermined level $V_c$ may be detected by using a comparator 17. For example, in a bright scene, the time $t_{INT}$ is short, and the time $t_{INT}$ is long in a dark scene. For this reason, the decision of the brightness can be made by merely counting the time $t_{INT}$. At this time, such control that the IRED 4a is in an inactive state is performed to prevent unnecessary light from being incident on the measuring distance device.

Furthermore, by the switching function of the selection switch 17b of the selection unit 17a, in an integration process, a sensor which decides the completion of integration can be selected.

Figure 3A:
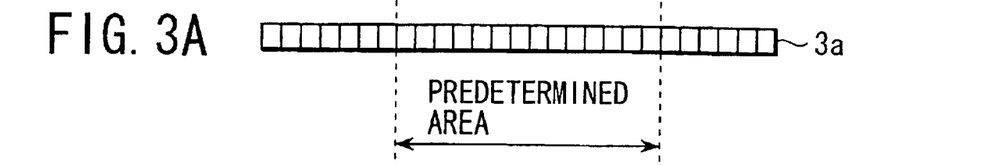
FIG. 3A is a schematic front view showing a light-receiving element of this measuring distance device.
Figures 3B, 3C:
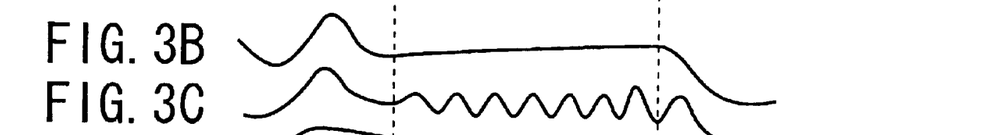
FIGS. 3B to 3F are graphs showing the waveforms of respective signals corresponding to the light-receiving element.
Figures 3D, 3E:
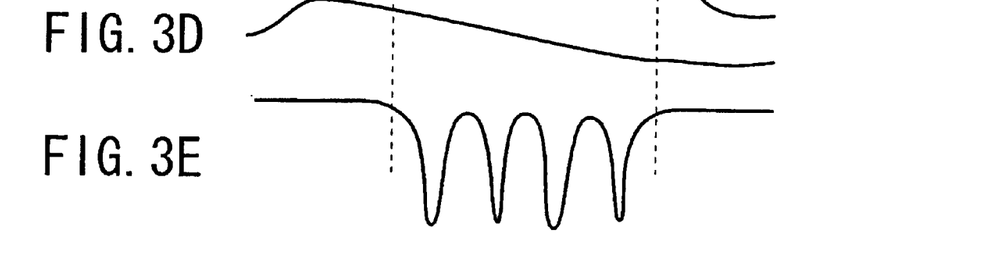

In the measuring distance device according to the present invention, it is decided by the sensor array (measuring distance sensor) 3a arranged as shown in FIG. 3A that an image signal output from an illustrated predetermined area has low contrast as shown in FIG. 3B, that a repeated pattern as shown in FIG. 3C, or that a monotonous change pattern as shown in FIG. 3D. In this case, when the reliability of a result of a correlative arithmetic operation is low, the IRED 4a serving as a light-projection means is driven to perform projection of light, and a measuring distance process is performed by the pattern of a reflected signal light returned from a measuring distance object.

Figure 3F:
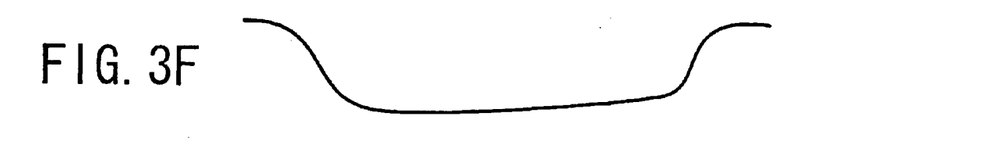

A mask for forming a pattern may be formed in front of the projection lens 4, or the pattern of the light-emitting unit itself may be used. When a reflected signal light generated by the IRED 4a is small, a measuring distance operation is performed by projection of an electronic flash having a light quantity larger than that of the IRED 4a. However, in this case, since a reflected signal light has no specific pattern, in many cases, a signal light distribution having low contrast shown in FIG. 3F is obtained.

Figure 3G:
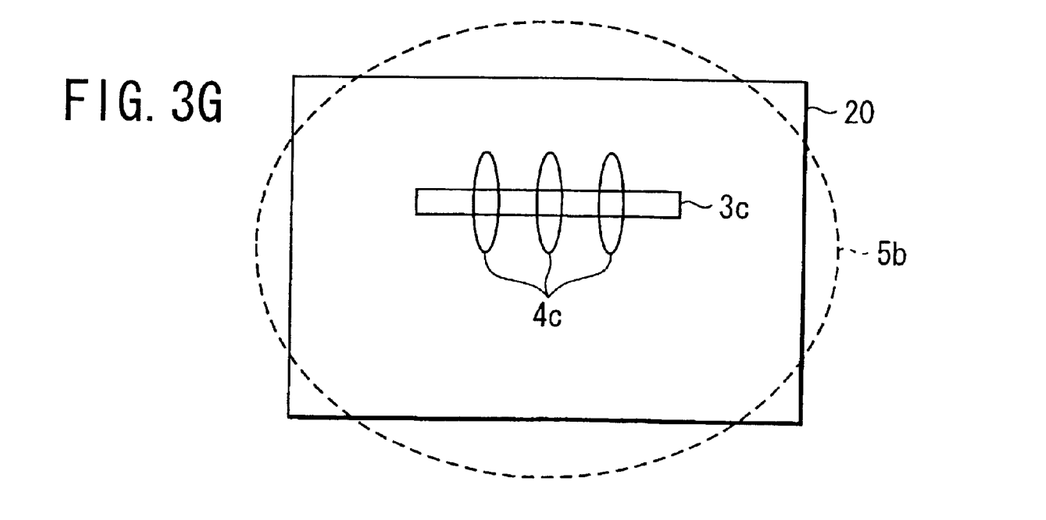
FIG. 3G is a diagram which shows a sensor area in a finder screen to explain a wide pattern and a narrow pattern obtained by an infrared light-emitting diode (IRED)

The positional relationship between the sensor array 3a (3b) and the projection pattern shown in FIG. 3G will be described below with reference to a finder screen (photographing angle of field) 20. More specifically, an area monitored by the sensor array 3a is an area indicated by a reference numeral "3c" at the central portion of this screen, electronic flash light must be irradiated on the entire screen to control exposure. As a result, as indicated by a dotted-line range indicated by reference numeral "5b", wide pattern light is obtained. On the other hand, pattern light of the IRED 4a forms a plurality of narrow infrared patterns as indicated by reference numeral "4c" on the screen central portion 3c.

In this manner, in the measuring distance device, a mode in which a measuring distance operation is performed by the difference between relative positions of image signals of an object to be focused without projecting the measuring distance light is called "passive AF", and a measuring distance mode in which projection of light of the IRED 4a or the electronic flash is performed with the stationary light removing operation is called "active AF".

Figure 6A:
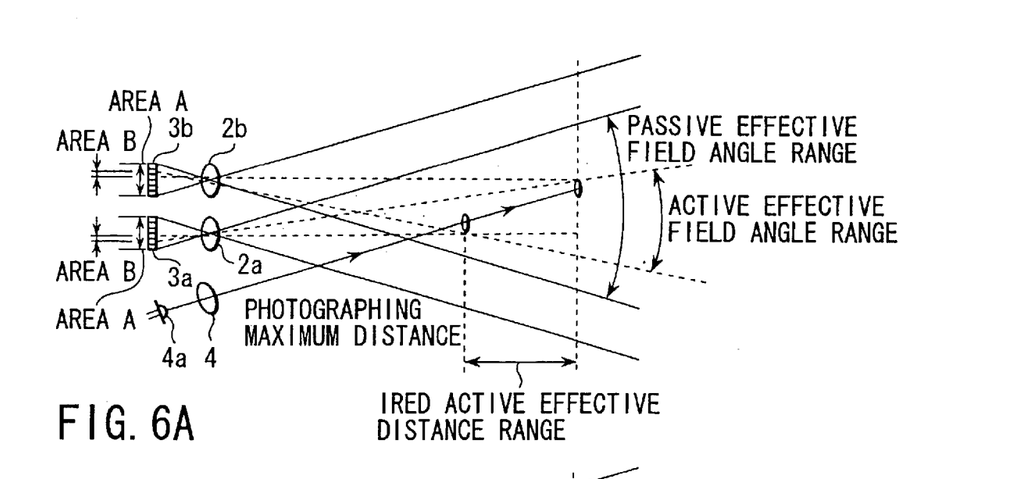
FIG. 6A is a diagram for explaining the difference between a range in passive AF and a range in active AF.
Figure 6B:
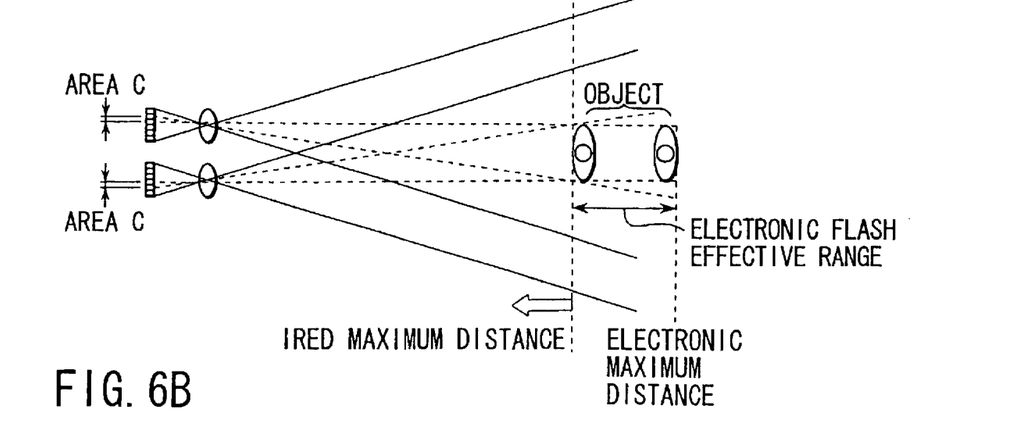
FIG. 6B is a diagram showing the difference between a maximum distance obtained when an IRED is used and a maximum distance obtained when an electronic flash is used.
Figure 7:
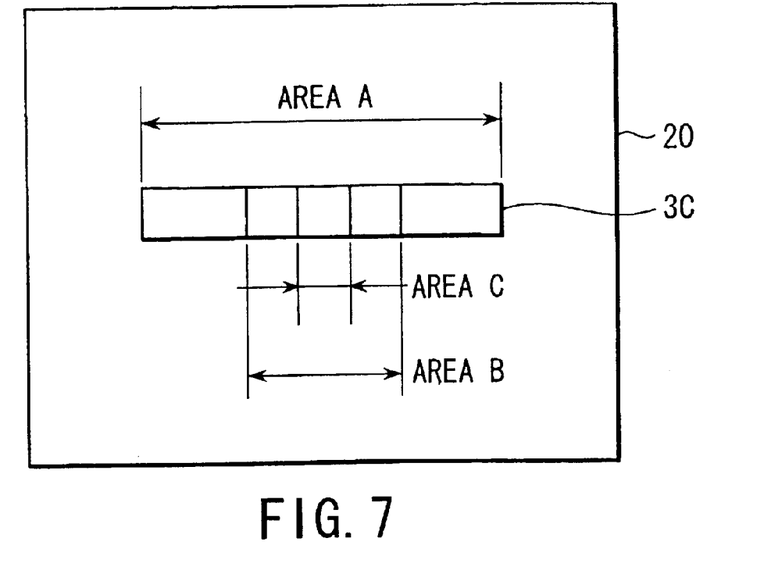
FIG. 7 is a diagram showing sensor areas in a finder screen to explain three areas which can be selectively switched.

The relationship between the two types of measuring distance schemes (modes) according to the present invention and the effective areas of the sensor arrays 3a and 3b will be described below with reference to FIGS. 6A and 6B. This fact shows that a measuring distance operation using a projection light source has different effective areas. FIG. 6A shows the difference between the passive AF and the active AF, and FIG. 6B shows the difference between a case in which an IRED is used and a case in which an electronic flash is used. FIG. 7 shows the sensor area 3c in the screen according to the present invention, and shows three characteristic areas which can be selectively switched.

In comparison with the active AF, in the passive AF depending on an object image signal, a measuring distance operation is less limited by a length, the range of an effective angle of field increases depending on the increases in width of the sensor arrays 3a and 3b as shown in FIG. 6A. This characteristic feature means that a portion corresponding to the area A in FIG. 7 can be measured. Even though the object is not seen at the center of the finder screen 20, such an advantage that an in-focus operation can be performed is achieved. Therefore, to perform a measuring distance operation in a wide area is significant with respect to a "wide filed of view".

However, in the active AF (abbreviated as "IRED active"), limitation on a distant side is caused by the light quantity, and limitation on a close side is caused by the photographing limit of the photographing lens of the camera. Since only an object existing within an IRED active effective distance range in FIG. 6A is subjected to a measuring distance operation, only a sensor in a part which can receives a projection spot (e.g., a sensor in an area B) is required to perform a measuring distance operation, and light being incident on the other parts is meaningless. In the IRED active mode, in order to prevent adverse effects caused by an integration decision or noise based on the meaningless light, such control that only the sensor in the area B is used is performed. That is, in other words, as portions to be changed, detection areas (light-receiving areas) are changed by a determination by a control unit 1a constituted by a CPU operated by a predetermined program, so that a sensor output to be digitized is limited. For this reason, a high-speed measuring distance process can be achieved.

The active AF (abbreviated as "electronic-flash active") using an electronic flash requires an enormous amount of energy and emits dazzling light. For this reason, it is convenient that the effect of the electronic flash is obtained at a position which is more than a maximum IRED effective distance away from the object. In this electronic-flash active, since only an area in a range in which the electronic flash light reaches may be detected, as shown in FIG. GB, an effective area in the sensor array is further limited (for example, area C). Similarly, when the electronic flash is active, detection areas are changed. For this reason, a sensor area in which a digitized value is input by a decision made by the control unit 1a is limited in the sensor array, integration control can be more accurately performed, and a time required for analog-to-digital conversion can also be shortened advantageously.

When the sensor areas of the three areas of the sensor array which are limitatively used are illustrated as monitor areas in the finder screen 20, an area arrangement in which the areas can be selectively switched in the finder screen illustrated in FIG. 7 is obtained. For example, the area A in which the most wide range can be detected, the area B which corresponds to the center of the area A and which is approximately ⅓ the area of area A, and the area C which corresponds to the center of the area C and which is approximately ⅓ the area of area B are designed such that these areas can be appropriately switched according to the above cases.

Figure 4A:
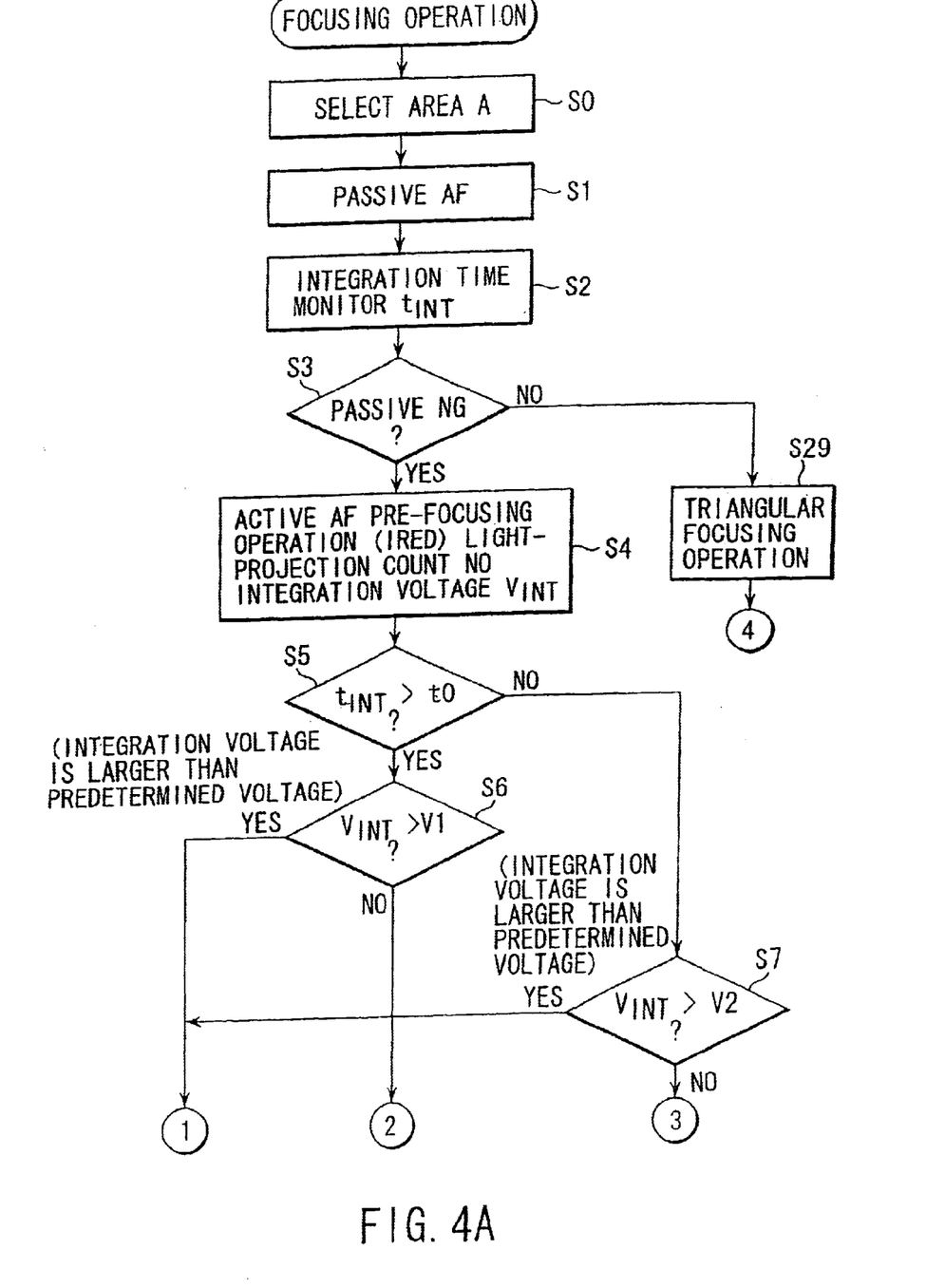
FIGS. 4A and 4B are flowcharts showing a measuring distance procedure of the measuring distance device according to the present invention.
Figure 4B:
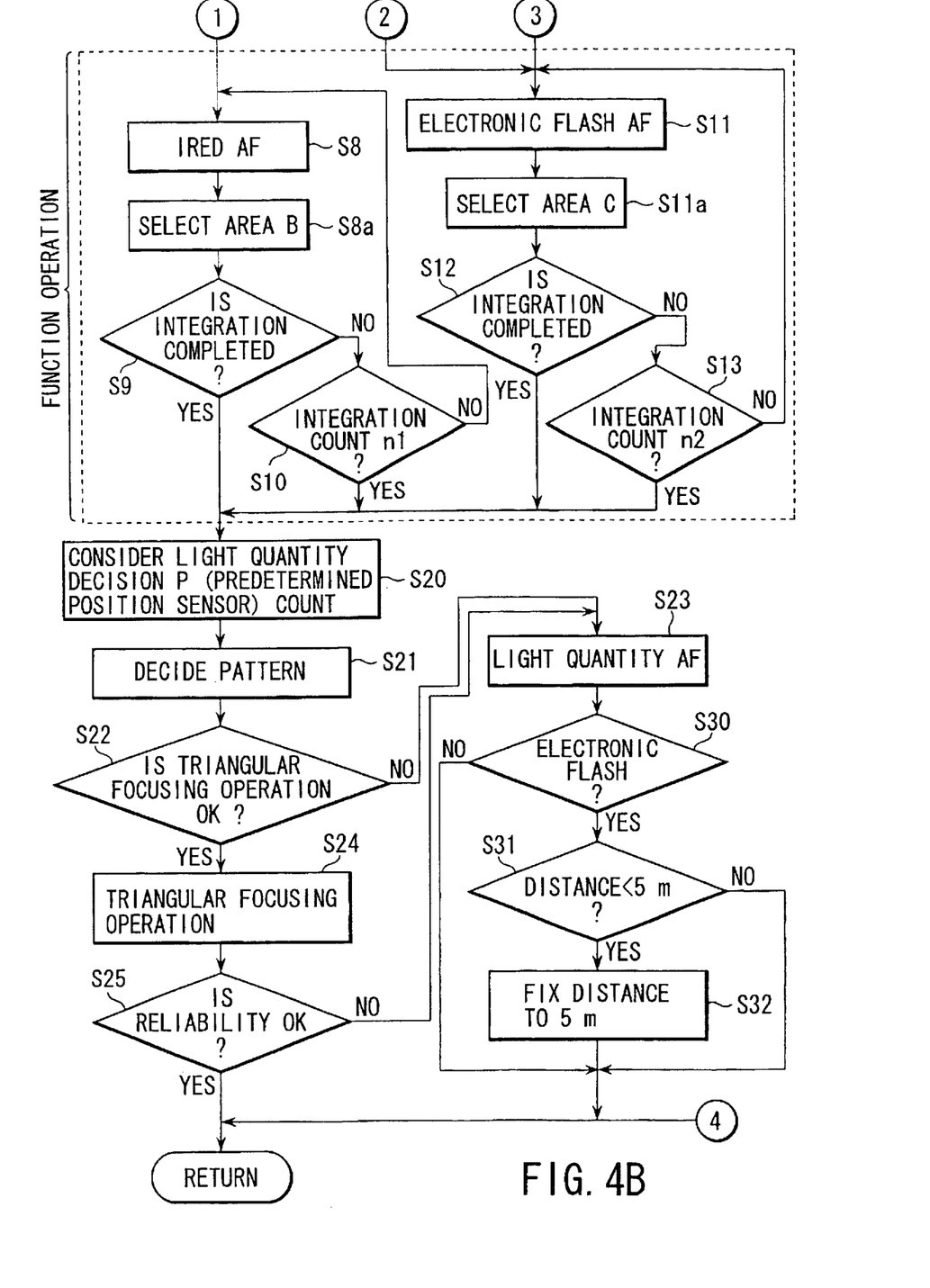

The operation of a measuring distance device with an area switching function will be described below in detail with reference to the flowchart illustrated in FIGS. 4A and 4B. It is assumed that a sensor area used in an integration decision is set as the area A and that the three areas, i.e., the area A and the areas B and C which are narrower than the area A can be switched depending on the following selection.

In step S0, an area (area A) of the sensor array which is suitable for the passive AF is selected (S0). In step S1, an integration process in a passive mode is performed by using the sensor in the area A (S1).

In step S2, a time $t_{INT}$ required to integrate a sensor output in the area A to a predetermined level is calculated (S2).

By the "pattern decision", the reliability of the passive AF is decided by a result of a correlative arithmetic operation (S3). If the reliability is high, the control flow shifts to step S29 to calculate a distance by triangular measuring distance on the basis of the two image signal positions (S29). Thereafter, the control flow is returned to a main routine (not shown) related to a camera sequence.

On the other hand, when the reliability of the passive AF is low, a "pre-measuring distance operation" using the IRED is performed in step S4. At this time, pulse light of a predetermined time is projected n times, and an integration voltage $V_{INT}$ is calculated by the analog-to-digital converter (S4). "Bright" can be decided such that the light of the IRED sufficiently reaches an object to be measured when the integration voltage $V_{INT}$ is high. In contrast to this, if the integration voltage $V_{INT}$ is low, since the light quantity of the IRED is not sufficient, electronic flash light which is stronger than the light of the IRED is projected. At this time, a correct decision cannot be made unless a stationary light component such as sunlight or artificial illumination which illuminates the object is considered.

Therefore, in order to detect the stationary light component, by using the time $t_{INT}$ (i.e., the result in step S2) obtained as a monitoring result in the passive AF in step S1, bright is decided in step S5 (S5). More specifically, in comparison with a predetermined time to, decision voltages $V_1$ and $V_2$ for deciding the sizes of the integration voltage $V_{INT}$ in the pre-integration using the IRED in step S4 are determined. If the time $t_{INT}$ is a short time, when "bright" is determined, the decision voltage $V_2$ higher than the decision voltage $V_1$ is compared with the integration voltage $V_{INT}$ (S7).

In a "dark" scene, when stationary light is weak, and when the time $t_{INT}$ is long, the decision voltage $V_1$ which is a constant smaller than the decision voltage $V_2$ is compared with the integration voltage $V_{INT}$ (S6). By the comparison process, it is decided whether a measuring distance operation using the IRED as a projection light source is performed or a measuring distance operation is performed under projection light obtained by the electronic flash device.

The integration voltage $V_{INT}$ is selected such that the largest incident light quantity is obtained in the predetermined area of the sensor array. This is the basic concept of the present invention, and is the concept which is described by using FIGS. 6A, 6B.

The integration voltage $V_{INT}$, an integration voltage at which the largest incident light quantity is obtained in all the sensors constituting the sensor array may be selected, or an integration voltage at which the largest incident light quantity is obtained in a predetermined area of the sensor array may be selected.

In this manner, by the projection light source which is alternatively determined, a measuring distance operation in an active mode using light of the IRED or light of the electronic flash is performed as a "regular measuring distance operation (original measuring distance operation)" in subsequent steps S8 or S11, respectively. In this measuring distance operation, light-projection integration is repeated until a predetermined voltage is obtained by emission of light for a predetermined time. When the obtained integration voltage $V_{INT}$ is higher than the predetermined voltage, it can be determined that light from the IRED reaches the object. However, when the integration voltage $V_{INT}$ is lower than the predetermined voltage, it can be determined that the light quantity of the IRED is not enough to perform a measuring distance operation, and the measuring distance device is controlled such that projection of electronic flash light which is stronger than the light of the IRED is performed.

When the projection light source used here is the IRED, in step S8 an AF operation using the IRED is executed (S8). More specifically, the brightness of an object is measured, and integration times are switched depending on the brightness. For example, when the brightness is high, a light-emission time is set to be short, otherwise, the light-emission time is set to be long to control the emission of light. Thereafter, the area B narrower than the area A is selected (S8a), an integration process is performed to the sensor in the area B. Pulse light of a predetermined time is projected n times, and the integration voltage $V_{INT}$ is calculated by the analog-to-digital converter. The completion of the integration is controlled in the decision loop in steps S9 and S10. In the step S10, an integration count limiter n1 is set, the time of the completion is controlled by the count n1.

As the result in the decision step S7, when the projection light source is an electronic flash device, in step S11 an AF operation using electronic flash light is executed (s11). Thereafter, a predetermined area C is selected (S11a), and an integration process is performed to the sensor in the area C. The completion of the integration is controlled in the decision loop in steps S12 and S13. More specifically, when light-projection integration is performed times the number of which is larger than a predetermined number, energy is wasted, and a time lag is adversely affected. For this reason, the integration process is completed within a predetermined time (S12). In this case, an integration count limiter n2 is set, and the time of the completion is controlled by the count n2 (S13).

Figure 5:
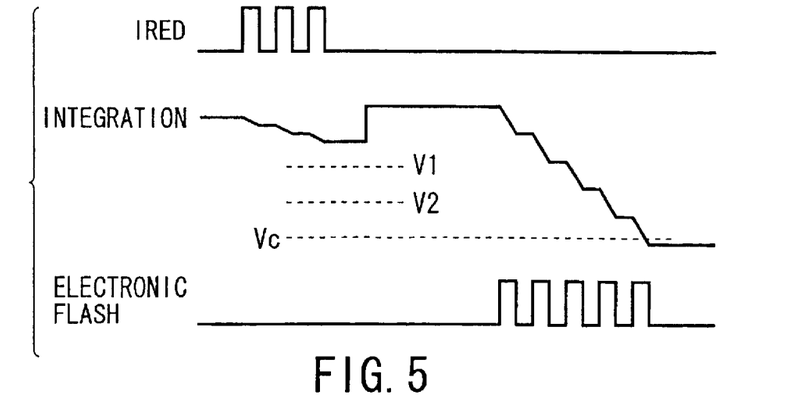
FIG. 5 is a timing chart showing a processing operation of this measuring distance device.

After the regular (original) measuring distance operation, on the basis of the result of a light quantity decision (S20) performed by a result P obtained by integrating a reflected light quantity (i.e., a value obtained by dividing the integration voltage $V_{INT}$ by an integration count) and the result of a pattern decision (S21), it is decided whether a triangular measuring distance operation can be performed or not (S22). At this time, as shown in FIG. 5, light-emission times and light-emission counts are switched by the brightness of the object. If a reflected light image signal by which the triangular measuring distance operation can be performed is obtained, in step S24 the triangular measuring distance operation is performed. On the other hand, when the pattern is not sufficient, or when it is decided in step S25 that the reliability of the triangular measuring distance operation is low, an AF operation (called a "light quantity AF operation") based on the result P related to the quantity of reflected light is performed in step S23.

As described above, when light is projected to examine a reflected light quantity, a large quantity of light is returned from a close object, and a small quantity of light is returned from a distant object. By a distance measuring scheme using this phenomenon, a measuring distance scheme which is also effective to an object having no contrast. However, in this case, it is assumed the reflectance of the object falls within a predetermined range.

Since an effective distance used when the IRED is used as a light source used in this case is different from an effective distance used when the electronic flash is used as the light source as illustrated in FIG. 6B, a decision in consideration of the difference is made to decrease the number of failures in the light quantity AF operation in the step S23. For example, in fact, a situation in which measuring distance light regularly reflected by an object such as a mark or a reflector of a tail lamp of an automobile, glass, or the like is directly incident on the sensor may occur.

Therefore, in step S30 when light is decided as light from an electronic flash, and when a result that a thing exists within, e.g., a distance of 5 m from the measuring distance device is obtained (S31), it is decided that the reliability of the measuring distance operation is low, and control is performed such that a distance limiter of "5 m" is operated (S32)

When an operation result based on the above flowchart is illustrated in a timing chart, the timing chart is expressed as in FIG. 5. This example illustrates the following case. That is, emission of light from an IRED is performed three times, and a result (integration voltage $V_{INT}$ obtained when $n_0=3$) of the pre-measuring distance operation is equal to or lower than a decision voltage $V_1$. It is decided that a measuring distance operation cannot be performed by light from the IRED, and a measuring distance operation by electronic flash light is started.

In this manner, in the measuring distance operation in the light quantity AF (step S23) is performed on the assumption that diffusive reflection of a thing having a standard reflectance is performed. Since the regular reflection is considered as described above, a failure of a measuring distance operation can be prevented by the control illustrated in the flowchart. The "area limitation" which is a characteristic feature of the present invention is also useful to prevent adverse effect of harmful light generated by the regular reflection as much as possible.

(Modification)

Figure 8:
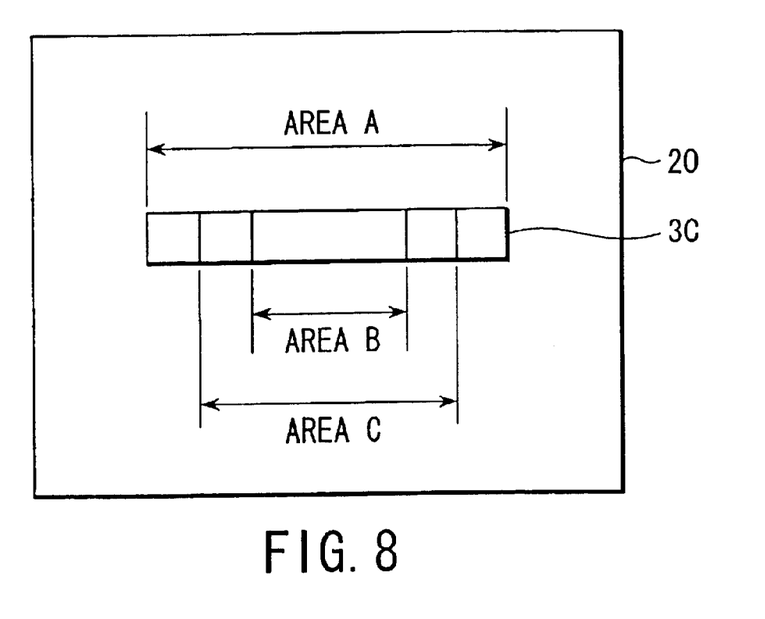
FIG. 8 is a diagram of one modification of FIG. 7 showing sensor areas in a finder screen.

In the embodiment described above, area A is the widest area, area B is the second widest area, and area C is the narrowest area (FIG. 7). However, projection of light by an electronic flash device is performed in a range which is wider than that of an IRED. For this reason, as illustrated in FIG. 8, a secondly wide area which is narrower than area A may be set as area C, and the narrowest area may be set as area B.

The light-emission count of the projection light source, the number and widths of selectable areas of a sensor area, various voltages used in the selection, and the like which are illustrated in the above embodiment are not limited to the values described in the embodiment, and may be appropriately changed.

In addition, various modifications can be effected without departing from the spirit and scope of the invention.

Although the present invention has been described on the basis of the embodiment, this specification includes the following invention.

(1) There can be provided a measuring distance device including:
  a sensor array;
  an integration circuit for performing integration control of an output signal obtained such that the sensor array detects an object image signal;
  an IRED and an electronic flash for projecting auxiliary light for a measuring distance operation on a predetermined point corresponding to the sensor array; and
  a selection unit for switching and selecting a predetermined sensor area of the sensor array used in the integration control to make it possible to use the predetermined sensor area,
  characterized in that a sensor area selected by the selection unit when the electronic flash is used in a measuring distance operation (passive AF) is made different from a sensor area selected by the selection unit when the IRED is used in the measuring distance operation to process only an obtained signal.

(2) There can be provided a measuring distance device according to item (1), characterized in that the sensor area of the sensor array is selected on the basis of an AF scheme, and light-emission times and light-emission counts of the electronic flash and the IRED are switched on the basis of the brightness of an object.

(3) There can be provided a measuring distance device according to item (1), characterized in that area limitation for an integration read sensor area is performed in an active mode using the IRED.

(4) There can be provided a measuring distance device according to item (1), characterized in that the selection unit performs switching such that an integration voltage of a sensor having the largest incident light quantity of all the sensors constituting the sensor array, or performs switching such that an area having the largest incident light quantity of the predetermined sensor areas.

As has been described above, according to the present invention, there can be provided a measuring distance device which can perform an accurate and high-speed measuring distance process by appropriately switching measuring distance schemes of a hybrid camera and by switching effective areas and working areas of sensor areas.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A measuring distance device comprising:
  a sensor unit which detects an image signal related to an object to be photographed in a finder screen;
  a projection unit which projects a signal light on the object;
  a selection unit which selects a detection area for the image signal of the sensor unit;
  a change unit which makes a detection area selected by the selection unit when the detection unit detects the image signal with projection of the signal light by the projection unit different from a detection area selected by the selection unit when the detection unit detects the image signal without projection of signal light by the projection unit; and
  a focus adjustment unit which performs focus adjustment on the basis of an image signal output in the detection area of the sensor array selected by the selection unit.

2. A measuring distance device according to claim 1, wherein the change unit makes the detection area of the sensor unit obtained when the detection unit detects the image signal with projection of the signal light by the projection unit narrower than the detection area of the sensor unit obtained when the detection unit detects the image signal without projection of the signal light by the projection unit.

3. A measuring distance device according to claim 1, wherein the projection unit includes an infrared light-emitting unit and an electronic flash device.

4. A measuring distance device according to claim 3, wherein the change unit makes a detection area selected by the selection unit when projection of a signal light is performed by the electronic flash device narrower than the detection area selected by the selection unit when projection of the signal light is performed by the infrared light-emitting unit.

5. A measuring distance device according to claim 3, wherein the change unit makes a detection area selected by the selection unit when projection of a signal light is performed by the infrared light-emitting unit narrower than the detection area selected by the selection unit when projection of the signal light is performed by the electronic flash device.

6. A measuring distance device according to claim 1, wherein the measuring distance device includes a determination unit which determines, depending on a result of a measuring distance operation performed without projection of a signal light by the projection unit, whether the projection unit is used in a subsequently performed original measuring distance operation or not.

7. A measuring distance device comprising:

a sensor array which detects an image signal related to an object to be photographed in a finder screen;

a first projection unit which projects a first signal light for a measuring distance operation on the object;

a second projection unit which projects a second signal light for a measuring distance operation on the object;

a first measuring distance unit which performs a measuring distance operation on the basis of an image signal output from the sensor array without projection of the signal lights for a measuring distance operation by the first and second projection units;

a second measuring distance unit which performs a measuring distance operation on the basis of an image signal output from the sensor array with projection of the signal light for a measuring distance operation by the first projection unit;

a third measuring distance unit which performs a measuring distance operation on the basis of an image signal output from the sensor array with projection of the signal light for a measuring distance operation by the second projection unit;

a selection unit which selects any one of the first to third measuring distance units;

a change unit which changes detection areas for the image signal by the sensor array depending on a selection result of the selection unit; and a focus adjustment unit which performs focus adjustment on the basis of an image signal output in the detection area of the sensor array selected by the selection unit.

8. A measuring distance device according to claim 7, wherein the selection unit selects the first measuring distance unit and selects either the second measuring distance unit or the third measuring distance unit depending on the reliability of a measuring distance result or selects neither of the second and third measuring distance units.

9. A measuring distance device according to claim 7, wherein the change unit makes the detection area of the sensor array widest when the first measuring distance unit is selected and makes the detection area of the sensor array narrowest when the third measuring distance unit is selected.

10. A measuring distance device according to claim 7, wherein the change unit makes the detection area of the sensor array widest when the first measuring distance unit is selected and makes the detection area of the sensor array narrowest when the second measuring distance unit is selected.

11. A measuring distance device according to claim 7, wherein the first projection unit is an infrared light-emitting diode.

12. A measuring distance device according to claim 7, wherein the second projection unit is an electronic flash device.

13. A measuring distance device comprising:

a sensor array which detects an image signal related to an object to be photographed in a finder screen;

an integration control unit which integrates the image signal detected by the sensor array;

a first projection unit which projects a first signal light for a measuring distance operation on the object;

a second projection unit which projects a second signal light for a measuring distance operation on the object;

a selection unit which selects a detection area for the image signal detected by the sensor array;

a first control unit which determines whether, depending on an integration voltage of the integration control unit when projection of light for a pre-measuring distance operation is performed by the first projection unit, an original measuring distance operation is performed by using the first projection unit or an original measuring distance operation is performed by using the second projection unit;

a second control unit which changes detection areas selected by the selection unit depending on a determination result of the first control unit; and a focus adjustment unit which performs focus adjustment on the basis of an image signal output in the detection area of the sensor array selected by the selection unit.

14. A measuring distance device according to claim 13, wherein the first control unit determines that a measuring distance operation is performed by using the first projection unit when the integration voltage satisfies a predetermined condition and that a measuring distance operation is performed by using the second projection unit when the integration voltage does not satisfy the predetermined condition.

15. A measuring distance device according to claim 14, wherein the second control unit makes a detection area of the sensor array obtained when a measuring distance operation is performed by using the first projection unit wider than a detection area of the sensor array obtained when a measuring distance operation is performed by using the second projection unit.

16. A measuring distance device according to claim 14, wherein the second control unit makes a detection area of the sensor array obtained when a measuring distance operation is performed by using the first projection unit narrower than a detection area of the sensor array obtained when a measuring distance operation is performed by using the second projection unit.

17. A measuring distance device according to claim 14, wherein the measuring distance device includes a timer unit which counts an integration time of the integration circuit when projection of light for a measuring distance operation is performed before projection of light for a pre-measuring distance operation by the first projection unit, and the first control unit determines, in consideration of a count result of the timer unit, one of the projection units by which an original measuring distance operation.

18. A measuring distance device according to claim 17, wherein a predetermined value to be compared with the integration voltage is changed depending on a time counted by the timer unit.

19. A measuring distance device according to claim 13, wherein the measuring distance device includes a decision unit which decides the reliability of an integration result obtained by the integration circuit when projection of light for a measuring distance operation by the first or second projection unit is not performed, and when the decision unit decides that the reliability is low, a pre-measuring distance operation with projection of a signal light for a measuring distance operation by the first projection unit.

20. A measuring distance device according to claim 19, wherein when the decision unit decides that the reliability is high, a triangular measuring distance operation on the basis of an integration result of the integration control unit.

21. A measuring distance device according to claim 13, wherein the measuring distance device includes a second decision unit which decides whether a triangular measuring distance operation can be performed on the basis of an output from the integration circuit or not after the original measuring distance operation with projection of light for a measuring distance operation by the first or second projection unit.

22. A measuring distance device according to claim 21, wherein when the second decision unit decides that the triangular measuring distance operation cannot be performed, a measuring distance operation based on a reflected light quantity of the object is performed.

23. A measuring distance device according to claim 13, wherein the first projection unit is an infrared light-emitting diode.

24. A measuring distance device according to claim 13, wherein the second projection unit is an electronic flash device.

25. A measuring distance device comprising:

a sensor unit which detects an image signal related to an object to be photographed in a finder screen;

a projection unit which projects a signal light on the object;

a selection unit which selects a detection area for the image signal of the sensor unit;

a change unit which makes a detection area selected by the selection unit in a first auto-focus mode where light is projected by the projection unit different from a detection area selected by the selection unit in a second auto-focus mode where light is not projected by the projection unit, wherein the first auto-focus mode is one of (a) passive, (b) active IR, and (c) active flash, and wherein the second auto-focus mode is another of (a) passive, (b) active IR, and (c) active flash; and a focus adjustment unit which performs focus adjustment on the basis of an image signal output in the detection area of the sensor array selected by the selection unit.

* * * * *